Dec. 16, 1969  G. M. WALSH  3,484,737
ACOUSTIC MAPPING APPARATUS
Filed Feb. 23, 1968  6 Sheets-Sheet 1

FIG. 1A
PLAN VIEW

FIG. 1B
ELEVATION VIEW

FIG. 2A
TRACK RESOLUTION GEOMETRY $P_x = \dfrac{D}{2}$
$P_y = \dfrac{C}{2W \cos \phi_B}$ $P_y = \dfrac{C}{2W \cos \phi_B}$
$W = \Delta f$
$P_r = \dfrac{C}{2W}$

FIG. 2B
CROSS TRACK RESOLUTION GEOMETRY

INVENTOR
GEORGE M. WALSH
BY Robert Bruce Brodie
ATTORNEY

FIG. 3A
ACOUSTIC MAPPING APPARATUS BLOCK DIAGRAM

FIG 3C
SIGNAL PROCESSOR BLOCK DIAGRAM

FIG 3B
TRANSMITTER BLOCK DIAGRAM

INVENTOR
GEORGE M. WALSH

BY Robert Bruce Brodie
ATTORNEY

Dec. 16, 1969   G. M. WALSH   3,484,737
ACOUSTIC MAPPING APPARATUS
Filed Feb. 23, 1968   6 Sheets-Sheet 5

INVENTOR
GEORGE M. WALSH
BY Robert Bruce Brodie
ATTORNEY

Dec. 16, 1969   G. M. WALSH   3,484,737
ACOUSTIC MAPPING APPARATUS
Filed Feb. 23, 1968   6 Sheets-Sheet 6

DEVIATION IN TRACK DISTANCE FROM A POINT REFLECTOR AT A GIVEN CROSS TRACK INTERVAL
OUTPUT FROM SIGNAL PROCESSOR
*FIG. 6*

SLANT RANGE AT CLOSEST APPROACH $r_0$ IN METERS

SIGNAL GAIN VS RANGE
*FIG. 7B*

73 UNFOCUSED BEAM SYSTEM
*FIG. 7A*

INVENTOR
GEORGE M. WALSH
BY Robert Bruce Brodie
ATTORNEY

United States Patent Office 3,484,737
Patented Dec. 16, 1969

3,484,737
ACOUSTIC MAPPING APPARATUS
George M. Walsh, Middletown, R.I., assignor to Raytheon Company, Lexington, Mass., a corporation of Delaware
Filed Feb. 23, 1968, Ser. No. 707,821
Int. Cl. G01s 9/66, 9/00
U.S. Cl. 340—3
12 Claims

ABSTRACT OF THE DISCLOSURE

An apparatus for mapping an area from a platform moving relative to the area comprising a transmitter for acoustically illuminating the area with a modulated beam having a width in both the track and cross-track platform directions. A receiver responsive to received reflected signals measures and records the phase difference between each received reflected signal and a reference phase in order of time of arrival. A signal processor combines the resulting phase difference signals from several transmissions having a common time of arrival with reference to the time of each transmission to yield a maximum at the track location and time of arrival corresponding to the location of a distinct acoustic reflector. Spatial resolution within the illuminated track area is independent of range and is defined by track linear dimension of the transmitting array. The cross-track resolution, also independent of range, is inversely proportional to modulating signal bandwidth. Cross-track ambiguity is reduced by frequency coding simultaneous or successive pulses or both.

---

This invention was made under a contract performed for the Department of the Navy.

BACKGROUND OF THE INVENTION

This invention relates to acoustic mapping apparatus and, more particularly, to acoustic mapping of an area from a platform moving relative to the area.

Acoustic mapping is the determination of topographic features upon a plane by illuminating an area on the plane with acoustic compressional waves and determining topographic feature due to alterations detected and measured of the received reflected waves. Acoustic mapping may be used by platforms moving through the air above the earth's surface and, for mapping the ocean bottom, by platforms moving on or beneath the sea. The subsequent discussion will be directed towards but is not to be taken as limited to mapping the ocean bottom.

In the prior art, cameras, side-looking sonar, and multiple beam echo sounding have been used to determine the features of the ocean's bottom. Cameras provided very limited area coverage and further required proximity to the bottom. Their range was exceedingly limited due to the underwater attenuation of light. Similarly, side-looking sonar was also required to be in close proximity to the ocean bottom. These inherent limitations on range and resolution in the side-looking sonar case arose because of the practical limitations as to the size of the aperture. Frequently, side-looking sonar was mounted on a towed underwater body. A consequence of this was that the exact location of the towed underwater body with respect either to a surface vessel or the geographical coordinates was uncertain.

One partially successful mapping technique was that of using multiple beam echo sounding. This is set forth in U.S. Patents 3,296,579 and 3,144,631. These references disclose the use of multiple narrow acoustic beams directed downward toward the ocean bottom and the employment of the time of arrival of echoes to measure depth profiles. A large area was illuminated because the conically shaped beam widths expanded with increasing depth or range. In these systems, the depth within the illuminated area could be measured with precision. However, the location of acoustic reflector sources was ambiguous. The ambiguity arose because, as the illuminating cone increased with depth, only average measurements could be obtained. They cannot resolve acoustic reflectors positioned within the beam width.

There are two critical limitations in the prior art. These limitations are increased in the resolution dimension with range and the small operating range due to the use of high frequencies inherent in obtaining resolution with limited physical source dimensions. For purposes of this specification the term resolution dimension is defined as the required separation between two reflectors such that the reflectors may be separately identified.

It is accordingly an object of this invention to devise an acoustic mapping apparatus having resolution dimensions independent of range and further having operating range substantially independent of acoustic wave frequencies.

It is another object of this invention to devise an acoustic mapping apparatus having a high rate of area coverage and low error in the determination of the relative location between the mapping body and the geographical coordinates of acoustic reflectors.

For purposes of this specification the mapping platform may be considered to move in a plane parallel to the planar area being mapped. The principal direction of motion is called the tracking direction. The direction transverse to the tracking direction is labeled the cross-track direction.

Additional limitations are inherent in prior art acoustic mapping apparatus. Among the problems are those of ambiguity arising in the cross-track direction and acoustic reverberation.

The cross-track ambiguity problem

How are successive echoes in the cross-track dimension distinguished? One prior art solution found in electromagnetic mapping apparatus was to narrow the cross-track beam width so that the area illuminated was so small that only one pulse could be contained therein. This solution is not useful because of the small ratio of sound velocity to ship velocity. That is, the mapping platform will travel a finite distance during the round trip time of the acoustic signal.

Among other alternatives is reducing the track speed of the moving mapping platform. This, however, reduces the rate of area coverage. In the case of a surface vessel used as a mapping platform, the track speed reduction makes it difficult for the surface vessel to maintain a straight course. Another alternative is to reduce the acoustic signal repetition frequency. This only increases the difficulty of properly measuring the signal phase of the signal in the track dimension and prevents adequate measurement of the returning signal phase. This introduces ambiguities in the track direction replacing the ambiguities in the cross-track direction.

It is accordingly an object of this invention to devise an acoustic mapping apparatus which eliminates or substantially reduces cross-track ambiguity consequently permitting cross-track beam width and increasing the rate of area coverage.

The reverberation problem

Classically, acoustic reflections from spatially distributed reflectors have collectively been referred to as reverberation. In the ocean, the order of significance of reverberation strength is that of the ocean bottom, surface, and volume. In the case of ocean bottom mapping bottom reverberation is, of course, desired.

It is accordingly another object of this invention to devise an acoustic mapping apparatus which diminishes the interference effects due to volume and surface reverberation.

SUMMARY OF THE INVENTION

The foregoing objects of this invention are satisfied in an embodiment in which an apparatus for mapping an area from a platform moving relative to the area includes transmitting means for acoustically illuminating the area with a modulated coherent beam having a width in both the track and cross-track platform directions. Receiving means responsive to received reflected acoustic signals measure and record the phase difference between each reflected signal and a reference phase in order of time of arrival. Signal processing means combine the phase difference signals from several separate transmissions having a common time of arrival with reference to the time of each transmission to yield a maximum at the track location and time of arrival corresponding to the location of a distinct acoustic reflector.

The combination of phase histories (phase difference signals) is analogous to the formation of a linear synthetic aperture in which each phase history corresponds to the output signal of one element of a synthetic array. The length of the synthetic array is proportional to the area illuminated. Since the illuminated area increases with range due to the physical spreading out of the actual beam, the length of the synthetic array (defining an equivalent aperture) also increases with range.

By analogy to physical arrays, the beam width and the track dimension is inversely proportional to array length. The effective beam width of the synthesized array is also inversely proportional to range. This arises from the fact that the track resolution dimension is proportional to the product of the effective synthesized beam width and range. However, the beam width is inversely proportional to range as previously noted. Consequently, the track resolution dimension is independent of range in view of the product range terms cancelling each other out.

Cross-track resolution dimension is also independent of range, it being an inverse function of the Doppler frequency bandwith, that is the bandwidth of the signal modulation due to motion of the mapping platform past an acoustic reflector.

If a source of distinct reference frequencies is used for keying the coherent beam or beams, then the interference effects of volume reverberation can be minimized. Similarly, the frequency coding of simultaneous or successive acoustic pulses enables the mapping apparatus to transmit as many pulses within the cross track area as there are frequencies available. This increases the unambiguous cross range swath width by a factor equal to the number of identifiable channels.

As a consequence of both the track and cross-track dimensions being independent of range, the rate of area coverage may be increased because a surface vessel instead of a towed underwater body may be used. Surface operation permits wide cross-track area due to the increased coverage of a beam. Also, the mapping platform speed may be increased because of the elimination of the towed body and cable. It must be remembered that conventional systems require the close proximity of the mapping platform to the area being mapped. Surface operations permit the more accurate positioning of the acoustic source with respect to geographic coordinate systems.

The prior art systems also required a high frequency of operation of the beam. This further imposed a severe range limitation due to the high attenuation of the signal in water. In contrast, the embodiments of this invention do not require that the resolution dimensions be directly a function of frequency. Thus, a low frequency signal operation may be used.

DESCRIPTION OF THE PREFERRED EMBODIMENTS

Figure 1A:
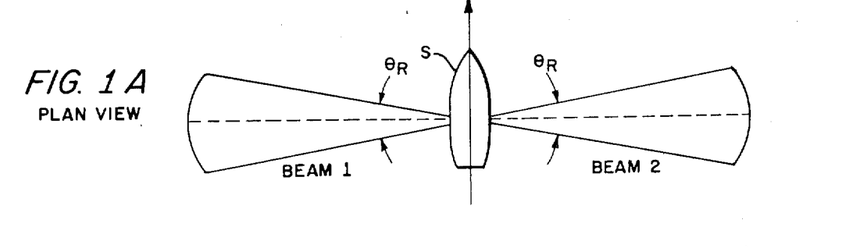
FIG. 1A is a plan view of a mapping platform with side-looking acoustic beams projecting therefrom.

FIG. 1A is a plan view of a moving platform S such as a ship whose forward locus of motion is termed a track. The platform S moves in the track direction $x$ at a velocity $v$. Shown projecting on either side of the platform are two acoustic beams 1 and 2. The beams have an angular width $\theta_R$ in the track direction.

Figure 1B:
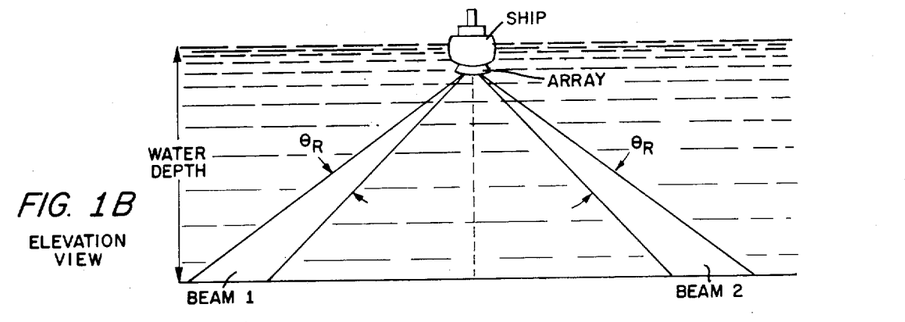
FIG. 1B is an elevation view of the mapping body showing the acoustic beams projecting downward therefrom.

FIG. 1B is an elevation view of the platform shown in FIG. 1A. In this view, the platform is shown as a surface vessel in relationship to the ocean bottom. The mapping platform could also be a submarine. An acoustic transducer array A mounted under the surface vessel $s$ and extending along its track length projects the two beams downward and away from the platform. The beam is propagated until it contacts a reflecting surface such as the ocean bottom. Each beam has a width $\phi_R$ in the cross-track direction. As is apparent, the motion of the platform along a track illuminates a swath on either side of the platform along the ocean bottom.

Figures 2A, 2B:
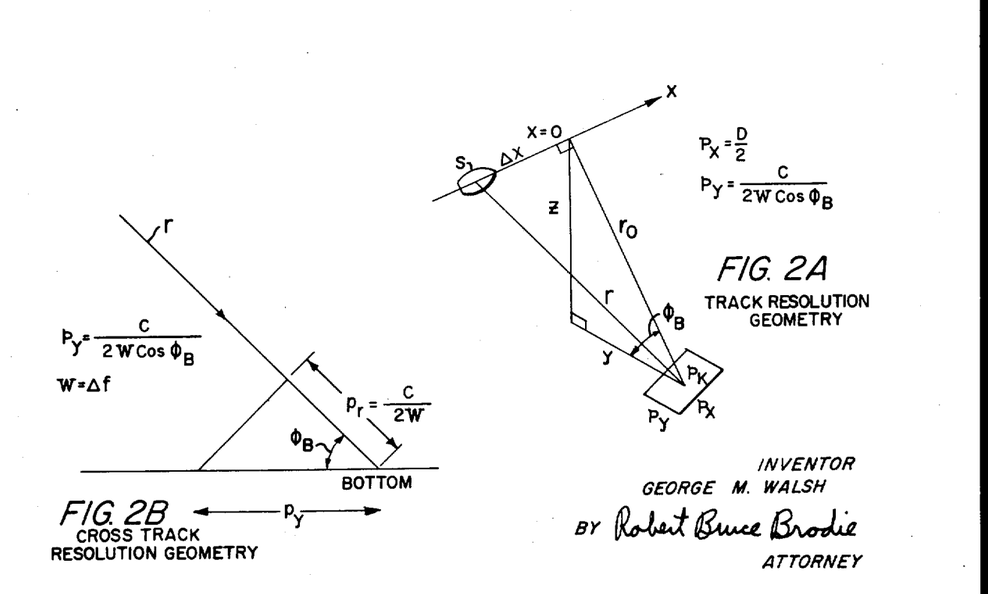
FIG. 2A exhibits the track resolution geometry between the mapping platform and the area to be mapped.
FIG. 2B exhibits the cross-track resolution geometry.

In FIGS. 2A and 2B the basic system geometry for determining both track and cross-track resolution is set forth. For clarity, coverage only on one side of the moving platform is shown. For purposes of discussion of FIGS. 2A and 2B, it should be recalled that the mapping apparatus derives cross-track resolution from the Doppler frequency bandwidth of the transmitted acoustic beam. The track resolution is achieved by measuring the phase of the received signal as a function of position along the moving platform track. The phase information is compared by receiving means to the expected phase of a return acoustic echo signal from a point target located at a particular range and track location. The output signal from the apparatus is a function of received signal strength and the degree of matching between the expected phase history and the actual received signal phase history. The time at which this match occurs indicates the track position of the acoustic reflector.

Returning to FIG. 2A a point reflector or elemental area $p_K$ is located on, for example, the ocean bottom at a slant range $r$ from platform S moving along track $x$. The point of closest approach between the platform S moving along track $x$ and the elemental area $p_K$ is $r_0$.

Both $r$ and $r_O$ represent lines contained within the acoustic beam projected from the platform. Y is a line lying along the same plane as $p_K$ upon which the slant range $r_O$ is projected through angle $\phi_B$. Z is the perpendicular between the intersection of $r_O$ and the track dropped down to the Y axis.

It may be recalled that the term resolution dimension is defined as the required separation between two reflectors such that the reflectors may be separately identified. The elemental area $p_K$ is determined by the product of the track resolution dimension $p_X$ and the cross-track resolution dimension $p_Y$. The following discussion is directed to determining the along track resolution dimension.

Track resolution dimension

The resolution in the track direction is achieved by utilizing the phase history of the echo signal returns from a point reflector. The motion through distance $\Delta X$ of a platform or surface vessel at track velocity $v$ as it draws near, passes and then recedes from the point $p_K$ produces a velocity component $dr/dt$ in the direction $r$. This velocity component $dr/dt$ directed towards the point $p_K$ will produce a Doppler frequency shift $\Delta f$ of the reflected received acoustic signal. The slant range $r$ as a function of track position $x$ is:

$$r = [r_O^2 + x^2]^{1/2} \approx r_O^2 + \frac{x^2}{2r_O}$$

wherein $r_o \gg x$

Substitute $x = vt$. Then:

$$r(t) = r_O + \frac{v^2 t^2}{2r_O}$$

The velocity component in the $r$ direction is:

$$\frac{dr(t)}{dt} = \frac{v^2 t}{r_O}$$

The Doppler frequency shift $\Delta f$ produced by this velocity component $dr/dt$ is given by:

$$\Delta f \approx \frac{2\left(\frac{dr}{dt}\right) f_0}{c} = \frac{2v^2 t f_0}{r_O c}$$

where $f_o$ is the center frequency of the signal.

This frequency shift is a linear function of time and resembles an FM slide signal. The total range of the Doppler shift depends on the beam width of the real transducer.

It may be recalled in connection with FIG. 1A, that the beam width $\theta_R$ was an angle measure of an acoustic beam in the along track direction. The along track distance $\Delta x$ covered by the beam on the ocean bottom through distance $r_O$ is approximately:

$$\Delta x \approx \theta_R r_O \approx \frac{\lambda r_O}{D}$$

where $\lambda$ is the wavelength of the carrier and D is the linear dimension of the physical aperture of the array in the track direction.

The time T required for platform S to cover one-half the distance $\Delta x$ from the track location at which the area of interest is first illuminated by the acoustic beam to the track location of closest approach is:

$$T = \frac{\Delta x}{2} = \frac{\lambda r_O}{2vD}$$

The returning signals will be received and available for processing as long as the beam illuminates the area $p_K$. Thus, the total time period is 2T.

If we now substitute for the time $t$ term in the relationship defining the Doppler frequency shift $\Delta f$, then the total frequency bandwidth of the Doppler signal is:

$$\Delta f = \frac{2v^2 t f_0}{r_O c} = \frac{2v^2 2T}{\lambda r_O} = \frac{2v}{D}$$

The time resolution of the signal waveform is inversely proportional to the bandwidth so that the time resolution of the Doppler signal $$\Delta t = \frac{1}{\Delta f} = \frac{D}{2v}$$

Finally, the track resolution dimension $p_X$ is equal to the distance traversed by the mapping platform in the time interval $\Delta t$.

Thus, $$p_X = v\Delta t = \frac{vD}{2v} = \frac{D}{2}$$

Note, the track resolution dimension is just one-half the length of the physical aperture. Also, this resolution dimension is independent of range since the length of the synthesized array is made larger as the range increases. This occurs, as previously mentioned, because the real beam illuminates, a longer area on the ocean bottom as range is increased.

Cross-track resolution dimension

FIG. 2B shows the cross-track resolution geometry. An incoming accoustic beam along ray path $r$ is incident at the ocean bottom at a grazing angle $\phi_B$. Resolution is achieved by modulating the transmitted beam. If the Doppler frequency bandwidth is W, echo returns spaced in time by $t = 1/W$ can be resolved. This corresponds to a distance along the $r$ axis of $p_r = c/2W$, where $c$ is the velocity of sound in the propagation medium.

The corresponding resolution cell on the bottom in the cross-track direction is then, $$p_Y = \frac{c}{2W \cos \phi_B}$$

The cross-track resolution depends on the grazing angle and modulation frequency bandwidth and is independent of range.

Figure 3A:
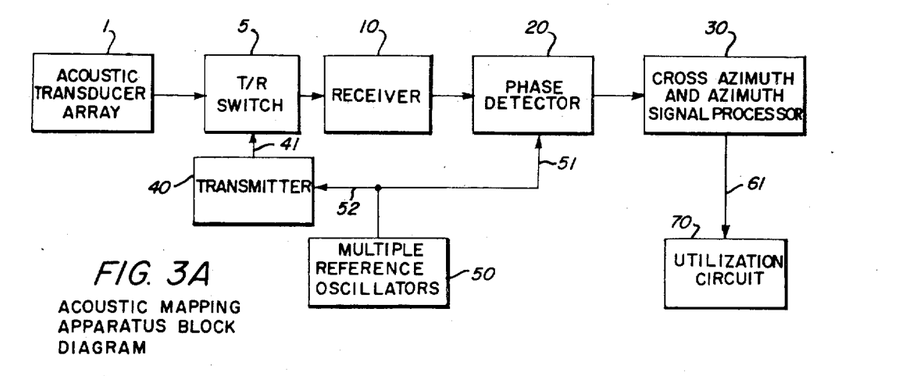
FIG. 3A shows the acoustic mapping apparatus block diagram.

FIG. 3A shows a block diagram of one embodiment of the acoustic mapping apparatus. Acoustic transducer array 1 is electrically connected to receiver 10 or transmitter 40 through transmit receiver switch 5. A source of distinct reference frequencies provided by multiple reference oscillators 50 are coupled to transmitter 40 and phase detector 20 over paths 52 and 51 respectively. The signal output from receiver 10 is compared in phase at detector 20 with the reference signal from oscillator 50. A signal processor 30 responsive to the phase difference signal from detector 20 over path 21 provides coordinate identifying information of significant ocean bottom acoustic reflectors to utilization circuit 70 over path 61.

This apparatus may be mounted under a moving platform as, for example, shown in FIGS. 1A and 1B. The acoustic transducer array 1 mounted, for example, on the underside of the platform, would project one or more beams preferably in a substantially side-looking direction. Transmitter 40 through T/R switch 5 causes acoustic transducer array 1 to illuminate an intended area to be mapped with a modulated coherent beam having a width in both the platform track direction and cross-track direction. Receiver 10 responsive to received reflected acoustic signals through transducer array 1 and T/R switch 5 applies the received detected signals through phase detector 20 for measuring the phase difference between each reflected and received acoustic signal and a reference phase from the distinct signal applied by oscillator 50 in order of time of arrival. The phase difference signals are recorded in a memory medium (not shown).

Signal processor 30 combines the phase difference signals having a common time of arrival to yield a maximum at the track location and time of arrival corresponding to the location of a distinct acoustic reflector.

The invention contemplates that multiple beams fanning out in the cross-track direction would result in the receipt of multiple echos. Each group of multiple echos has a distinct time of arrival and a track location. The combining of the phase difference signals representative of the echo signals through, for example, a correlation process will yield a maximum having coordinate information defined by track location and arrival time.

The transducer array

Transducer array 1 may be either a planar array or a section of a cylinder having an array length proportional to the desired track resolution. The array length is chosen independent of wavelength. The array width depends only on the desired cross-track swatch width. It should be sufficiently wide to form an acoustic beam which will illuminate this swath at any roll angle of the platform. An approximately cylindrical array is desirable in order to reduce side lobes and maintain good beam shapes for most roll angles.

The element spacing in the transducer array ought to be somewhat greater than one-half the operating frequency wavelength for good operation. A dome will be required to protect the array and reduce drag and flow noise when the moving platform is operated in water. The dome should be selected from a material that has little effect on beam patterns and element phase shifts.

The transmitter

Figure 3B:
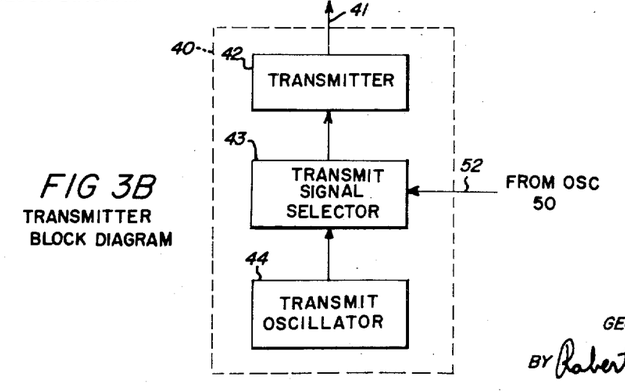
FIG. 3B is a block diagram of the transmitter shown in FIG. 3A.

A block diagram of the transmitter 40 is set forth in FIG. 3B. The transmitter comprises a group of modular transmitters 42 each generating sufficient electrical power to drive at least one or more rows of elements in the transducer array to simplify problems of beam steering and reliability. Transmitter oscillator 44 should consist of a stable oscillator which is heterodyned with another oscillator (not shown) to provide multiple transmit frequencies for use with the frequency coding of beams in the cross-track direction. This avoids cross-track ambiguity. A transmit signal selector 43 is interposed between modular transmitters 42 and the transmitter oscillator 44 for selecting one of the multiple transmit frequencies in response to a frequency signal from the multiple reference oscillators 50 as applied on path 52. In this manner, the frequency of each successive transmission is keyed to a distinct reference oscillator frequency.

The signal processor

Figure 3C:
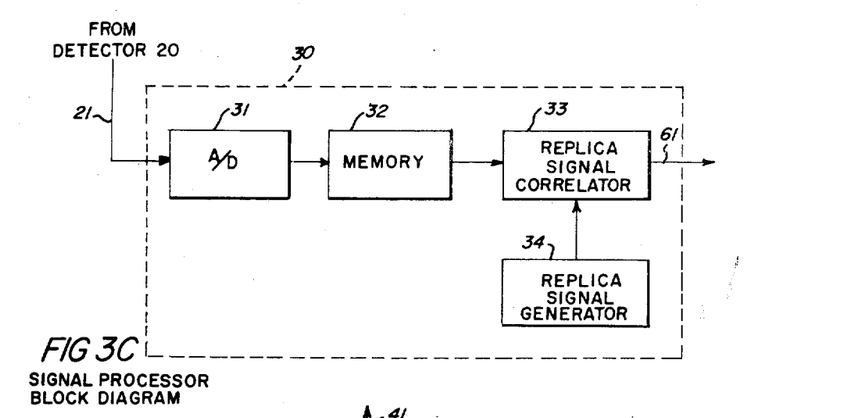
FIG. 3C shows a block diagram of the signal processor shown in FIG. 3A.

FIG. 3C is a block diagram of signal processor 30 shown in FIG. 3A. Since multiple beams may be simultaneously used to illuminate several areas and multiple frequency channels may be used to increase unambiguous cross-track interval, the apparatus must be able to detect and process multiple simultaneously received echo signals. To this extent a plurality of phase difference signals may be applied to signal processor 30 from detector 20 over path 21. The phase difference signals are converted from analog to a corresponding digital signal form through analog-to-digital converter 31. The converted difference signals are then stored in a memory medium 32. A replica signal correlator 33 performs a cross correlation between the difference signals stored in memory and an expected or average phase history stored in the replica signal generator 34. The result of the cross correlation will yield a maximum signal at that point along the track and time of arrival corresponding to a distinct acoustic reflector.

Motion correction

Figure 4A:
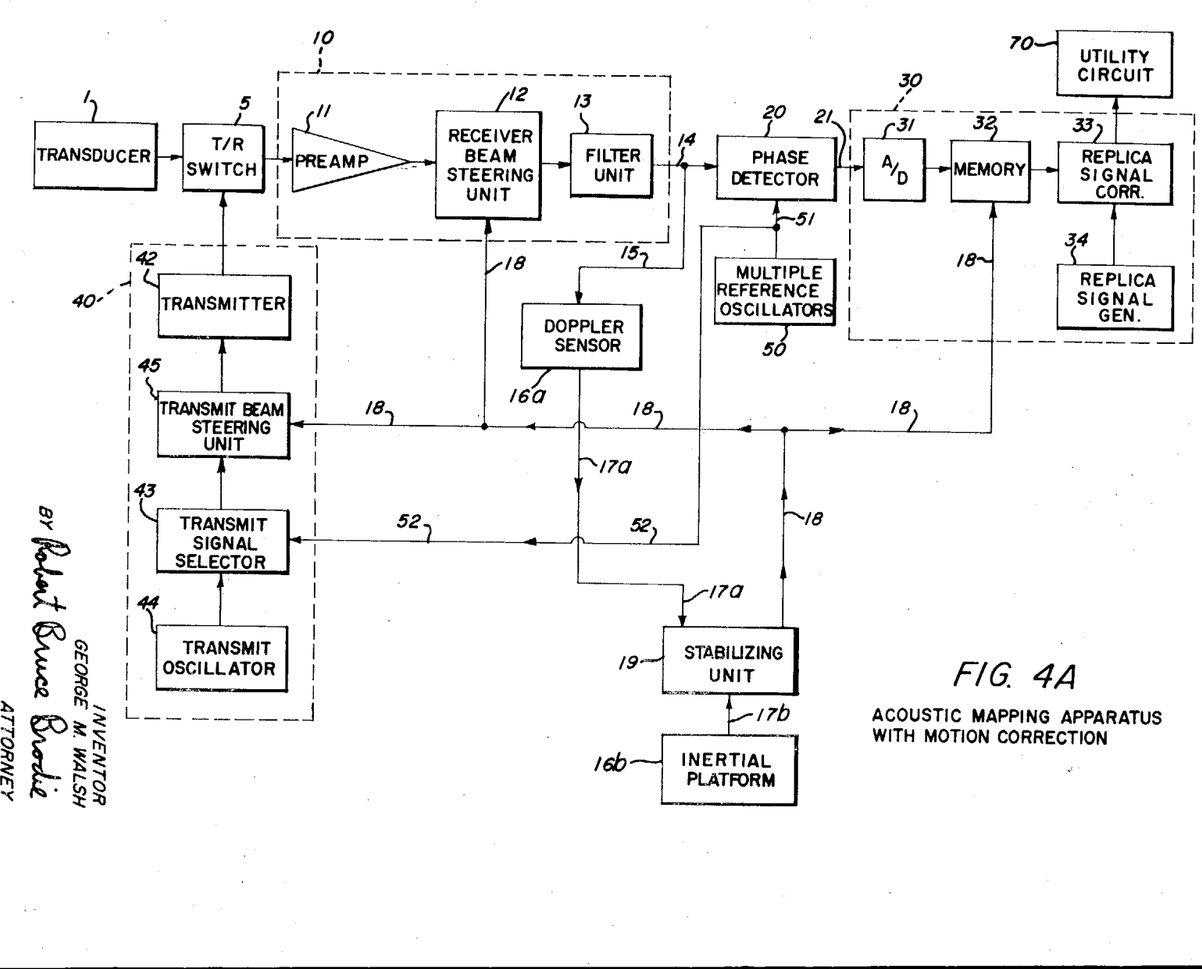
FIG. 4A is a detailed block diagram of the acoustic mapping apparatus with motion correction.

An acoustic mapping apparatus with motion correction is shown in FIG. 4A. As previously mentioned, the stability of the mapping platform may be affected by spurious motions. This has specific reference to the use of a surface vessel moving along a surface track while mapping the ocean bottom. In this embodiment, receiver 10 is shown in block diagram form as comprising a preamplifier 11 driving a receiver beam steering unit 12 in with a filter unit 13. A transmit beam steering unit 45 is shown driving modular transmitter 42 in transmitter 40. A Doppler sensor 16a is coupled to the output of receiver 10 at junction 14. An inertial platform 16b provides frequency signals corresponding to stable geometric coordinates to a stabilizing unit 19 over path 17b. Stabilizing unit 19 receives Doppler shift information from sensor 16a over path 17a, computes stabilization corrections from the Doppler and inertial subsystem data, and applies beam steering correction information over path 18 to the transmit steering unit 45, the receiver beam steering unit 12, and memory 32.

In a mapping apparatus employing two beams as, for example, shown in FIGS. 1A and 1B, two other beams (not shown) can be used to provide additional Doppler motion sensing information for purposes of beam steering. One of the other (not shown) beams will point in the forward track direction and the other of the (not shown) beams will point in the aft track motion direction. The beams must be stabilized for roll, pitch, and yaw.

The requirement for stabilization is such as to keep the mapping illumination beam positioned on the desired swath.

The receiver

Figure 4B:
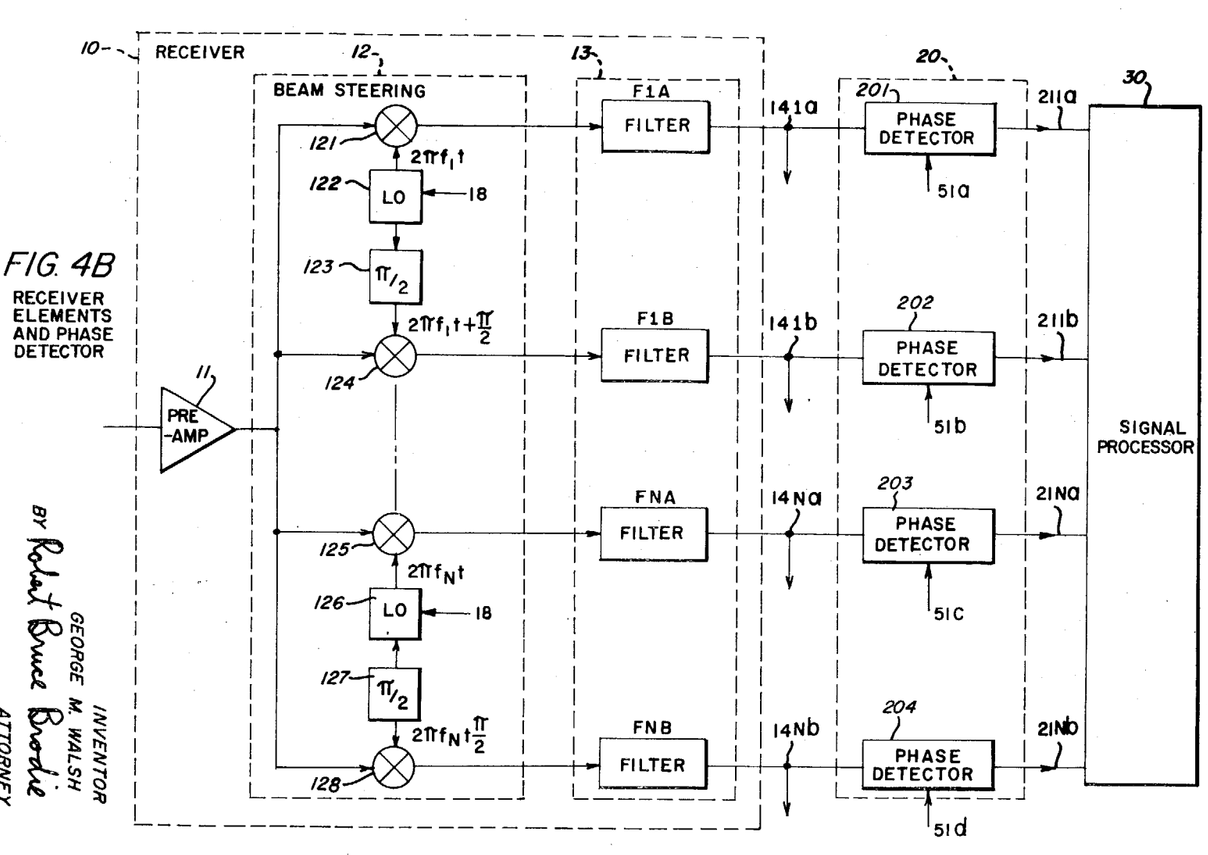
FIG. 4B is a detailed schematic diagram of the receiver elements and phase detector of the receiver shown in FIG. 4A.

Reveiver 10 as shown in FIG. 4B comprises a preamplifier 11, a plurality of filters 13 and a plurality of mixers 121, 124, 125, 128 and corresponding local oscillators 122, 126. The mixer-local oscillator combinations are arranged in parallel and intercouple the preamplifier 11 to corresponding ones of the parallel filters 13. The receiver elements, as set forth in this figure, are devised for the mapping apparatus that employs both frequency coding and motion correction. In this regard, the filter unit 13 comprises filters F1A–FNA each of whose bandpass center frequency corresponds to a distinct reference frequency of the multiple reference oscillator source 50. The local oscillators 122 and 126 each drive two mixers 121 and 124; and 125 and 128 respectively. One of the mixers of each pair, namely 124 and 128 are driven through a 90° phase shifting circuit 123 and 127. The use of pairs of mixers to provide for in phase and quadrature level signals is to enable cancellation of the unknown phase of the local oscillator 122 and 126.

The receiver of this embodiment may be used for motion correction. A motion correction frequency signal from the stabilizing unit 19 shown in FIG. 4A is applied on conductors 18 to the respentive local oscillators. Doppler shift is applied to Doppler sensor 16a shown in FIG. 4A at the nodal points 141a–14Nb. The outputs from the corresponding filters are applied to the corresponding ones of the phase detector 20, that is, phase dectors 201–204 for purposes of deriving a phase difference signal which will appear on corresponding ones of the output lines 211a–21Nb to signal processor 30.

Successive groups of transmitted signals may be offset in frequencies sufficiently so that the frequency bands required for the cross-track modulation do not overlap. In this way, the unambiguous cross-track can be multiplied by the number of different carrier frequencies, and the pulses may be transmitted and received with a minimum of interference due to reverberation.

Signal processor elements

Figure 5:
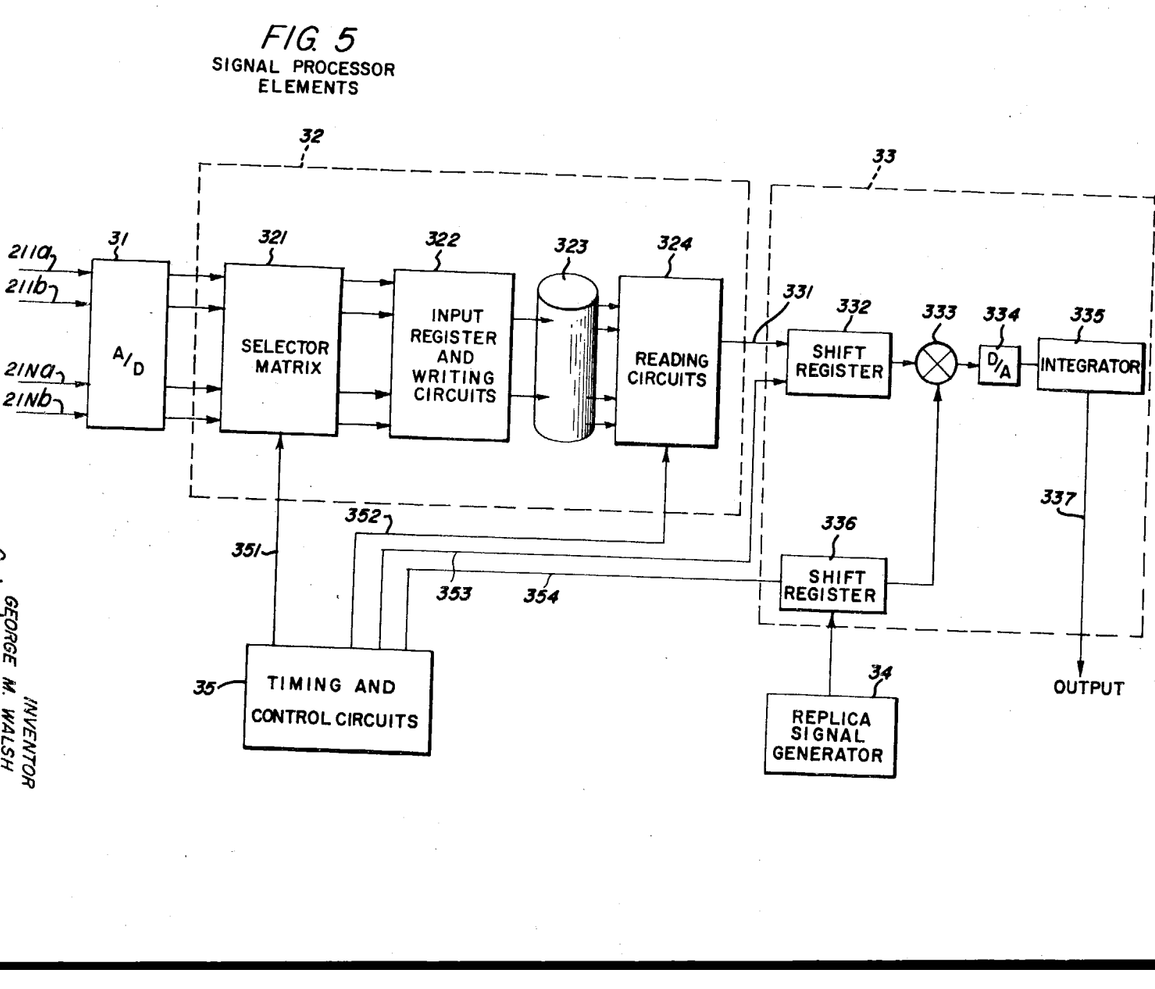
FIG. 5 is a detailed block diagram of the signal processor elements shown in FIG. 3C.

In FIG. 5 the signal processor elements shown in FIG. 3B are set forth in greater detail. The phase difference signal outputs shown in FIG. 4B as 211a–21Nb are applied to analog-to-digital converter 31. This converter supplies digitized signals to memory medium 32. Correlator 33 cross correlates those phase difference signals in memory from several transmissions having a common time of arrival having reference to the time of each transmission with approximate signals of an acoustic reflector at a particular track position from replica signal generator 34. Timing and control of the correlator, memory medium and the replica signal generator is performed by timing and control circuit unit 35.

Memory medium

Memory medium 32 comprises a magnetic drum unit 323 having multiple heads arranged in a line along the cylindrical axis of the drum. At least one track is used for each transmission in forming the synthetic array. Each track is capable of storing, for example, a multiple bit digital signal representative of the signal return for the range interval of interest.

The dimension along the drum axis corresponds to the track direction, each head location corresponding to the position of the ship in real space at the time of that pulse transmission. The cross-track information is recorded around the circumference of the drum. Input data is recorded on the drum with as many tracks at a time as there are multiple frequency channels, one for each frequency coded channel. The track signal at successive cross-track intervals is available in parallel form at the multiple head outputs of the drum as it revolves.

Selector matrix 321 accepts the digital output from analog-to-digital converter 31 and appropriately gates it into the input register and writing circuits 322 under control of the timing and control circuits 35, which apply control signals on line 351. Reading circuits 324 gate out the signal information obtained from the multiple read heads and under control circuits 35 is loaded into shift register 332 of correlator 33 over path 331 as regulated by control signals on line 352.

Correlator

Replica correlator 33 comprises a pair of multiple bit shift registers 332 and 336 respectively which are driven by memory medium 32 through reading circuits 324 and replica signal generator 34 under control of control signals on lines 353 and 354. A half-adder or other equivalent digit match and mismatch logic can be used for the correlation multiplier 333. The output from unit 333 is applied to a digital-to-analog converter 334 which drives an integrator 335. The signal processor output consists of a serial line-by-line readout of a high resolution map image, each line of the high resolution image corresponding to the map information at a particular position on the mapping platform track coordinate for all cross ranges. This signal is ideal for recording by a conventional line scan recorder to produce a complete two dimensional map, where intensity variations represent fluctuations in the received acoustic signal level. This corresponds to features observed within the illuminated area.

In order to process in real time through signal processing unit 33 it is necessary to perform a replica correlation operation on the track signals at each and every cross range interval during the time between successive beam transmissions. In addition, the replica correlation characteristic depends on range, so that a different replica is required at each cross range interval. This is equivalent to focussing the array at each cross range interval.

The replica signal will consists of the expected track signal at that particular cross track interval. Since the only difference in the track signals from different ranges is in the signal duration, the replicas can be generated from one stored replica, for example, in a re-entrant shift register. The signal duration can be varied by changing the shift out rate of the replica shift register so as to focus the system at any desired range.

Figure 6:
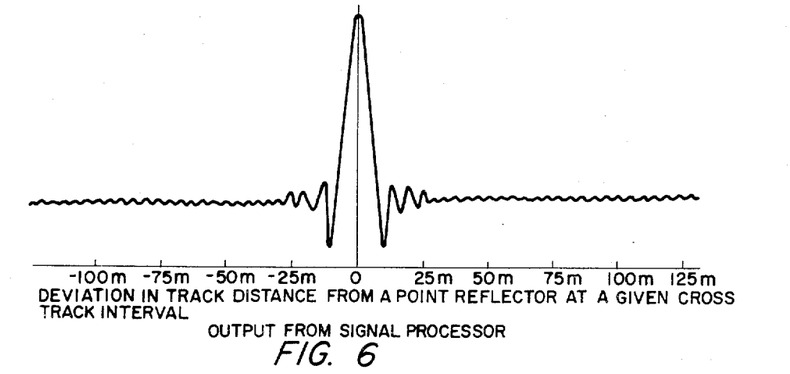
FIG. 6 shows the signal output from the signal processor as a deviation in track distance from a point reflector at a given cross-track interval.

In FIG. 6 an output signal from the signal processor is shown as a magnitude as a function of deviation in track distance from a point reflector at a given cross-track interval. That is, taking the position along track as 0 where the mapping platform is at the point of closest approach $r_O$ to a point $p_K$, a substantial magnitude or signal to noise is exhibited which rapidly decreases as one recedes along the track in either direction. This magnitude may be used to control the intensity of a display.

Figure 7A:
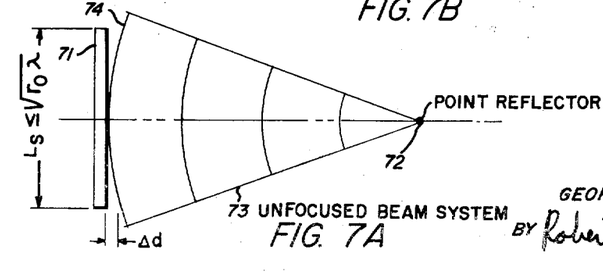
FIG. 7A shows the geometry of an unfocussed system using the apparatus shown in FIGS. 3A and 4A.

FIG. 7A shows an unfocussed beam system exhibiting the geometric interaction between the acoustic echo 73, point reflector 72, and planar transducer 71. The unfocussed system uses the same reference phase to make phase comparisons with incoming signals. Consequently, the maximum length $L_S$ of the synthetic array 71 (planar transducer) will be limited by the phase error resulting from the curvature 74 of the received signal phase front.

Let $\Delta d$ be the error between the linear array 71 and the curvature 74 of the phase front. Further, let $\lambda$ equal the acoustic wavelength. If the error $\Delta d$ is to be no greater than $\lambda/4$, then the limit must be set to be such that $$\Delta d \leq \lambda/8$$

because of the delay effect on two-way propagation. The length $L_S$ should be less than or equal to $\sqrt{r_O \lambda}$ in order to satisfy the error $\Delta d$ criterion. Thus, the resolution dimension for the unfocussed system is proportional to the range taken to the ½ power. In contrast, the focussed array matches the curvature of the phase front so there is neither error nor limit on the length of the array.

As has been mentioned, the array length $L_S$ is equal to $\sqrt{r_O \lambda}$. The track resolution dimenion $p_X$ is experimetally approximately equal to:

$$\frac{\lambda r_O}{2 L_S} = \frac{\lambda r_O}{2\sqrt{r_O \lambda}} \cdot \frac{\sqrt{r_O \lambda}}{\sqrt{r_O \lambda}} = \frac{\lambda r_O}{2 r_O \lambda} \sqrt{r_O \lambda} \therefore p_X = \tfrac{1}{2}\sqrt{r_O \lambda}$$

Figure 7B:
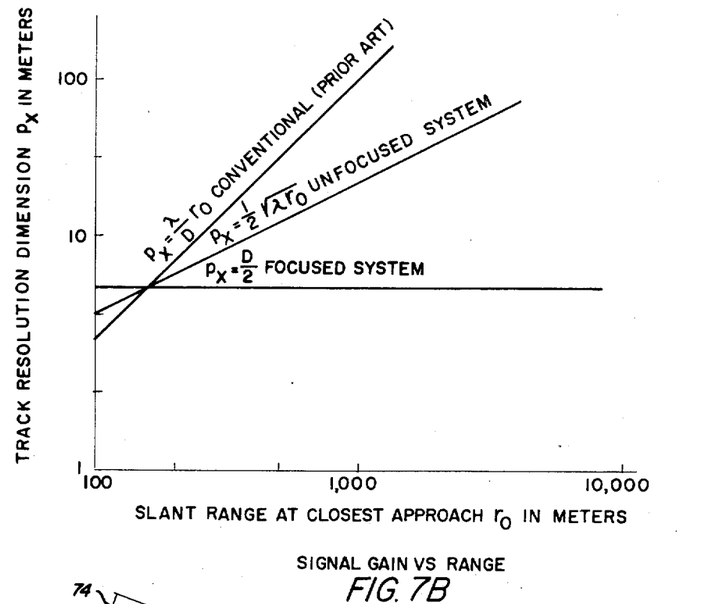
FIG. 7B shows the graphical relationship of track resolution dimension and slant range of the focussed, unfocussed and prior art acoustic mapping systems.

In FIG. 7B the graphical relationship between slant range $r_O$ and track dimension $p_X$ is set forth in the focussed, unfocussed and conventional systems. The focussed system shows that the track resolution is independent of range while the unfocussed system is a function of the square root of range. It is, of course, assumed that the wavelength and the array length remain constant.

SUMMARY OF THE INVENTION

By way of summary, there are two general limitations to be found in prior art acoustic mapping systems. These limitations are the increase in resolution dimension with range and the small operating range due to the use of high frequencies inherent in obtaining resolution. Additional limitations particularly associated with acoustic mapping through a liquid medium, such as the ocean, are those of cross-track ambiguity and reverberation.

The prior art limitations are overcome by an apparatus for mapping an area from a platform moving relative to the area. The apparatus comprises transmitting means for acoustically illuminating the area with modulated coherent acoustic beams having a width in both the track and cross track platform directions. Receiving means responsive to received reflected acoustic signals measure and record the phase difference between each reflected signal and a reference phase in order of time of arrival. Signal processing means combine the phase difference signals from several transmissions having a common time of arrival with reference to the time of each transmission to yield a maximum at the track location and time of arrival corresponding to the location of a distinct acoustic reflector. The combination of phase histories (phase difference signals) is analogous to the formation of a linear synthetic aperture in which each phase history corresponds to the one output signal of an element of a synthetic array. Track resolution is independent of range and is defined by the track linear dimension of the transmitting array. The cross-track resolution, also independent of range, is inversely proportional to the modulating frequency bandwidth. Cross-track ambiguity and the interference effects of surface and volume reverberation are reduced by the frequency coding of the simultaneous or successive modulated acoustic pulses or both.

I claim:
1. An apparatus for mapping an area from a platform moving relative to the area comprising:
   means for acoustically illuminating the area with a modulated coherent beam having a width in the track and cross-track platform directions;
   means responsive to received reflected signals for meas- uring and recording the phase difference between each received reflected signal and a reference phase in order of time of arrival; and means for combining the phase difference signals from several transmissions having a common time of arrival with reference to the time of each transmission to yield a maximum at the track location and time of arrival corresponding to the location of a distinct acoustic reflector.

2. An apparatus according to claim 1, characterized in that the signal processor comprises:

a replica signal generator for providing a signal characteristic approximating the expected signal characteristic at a predesignated slant range interval; and a correlator for cross correlating each phase difference signal from successive transmissions having a common time of arrival with reference to the time of transmission with the replica signal to yield a maximum.

3. An apparatus according to claim 1, characterized in that the means for acoustically illuminating the area comprise:

a synthetic transducer array having a track dimension proportional to the square root of the product of the slant range of closest approach and the operating beam frequency wavelength, the synthetic transducer array track dimension thereby defining a track resolution dimension proportional to one-half the square root of the product of the slant range of closest approach and operating beam frequency wavelength.

4. An apparatus for mapping an area from a platform moving relative to the area comprising:

a source of distinct reference frequency signals;

means for acoustically illuminating the area with a modulated coherent beam having a width in the track and cross-track platform directions, the acoustic illuminating means comprising:

means for selecting a corresponding center frequency of the coherent beam responsive to each distinct reference signal;

means responsive to received reflected signals for measuring and recording the phase difference between each received reflected signal and the corresponding distinct reference frequency signal in order of time of arrival; and means for combining the phase difference signals from several transmissions having a common time of arrival with reference to the time of each transmission to yield a maximum at the track location and time of arrival corresponding to the location of a distinct acoustic reflector.

5. An apparatus for mapping an area from a platform moving relative to the area comprising:

means for acoustically illuminating the area with a modulated beam having a width in the track and cross-track platform directions, the means including a transmitting array whose track dimension defines the track resolution dimension independent of the slant range of the beam;

means responsive to received reflected signals for measuring and recording the phase difference between each received reflected signal and a reference phase in order of time of arrival; and means for combining the phase difference signals from successive transmissions having a common time of arrival with reference to the time of transmission to yield a maximum at the track location and time of arrival corresponding to the location of a distinct acoustic reflector.

6. An apparatus for mapping an area from a platform moving relative to the area comprising:

means for acoustically illuminating the area with a modulated beam of bandwidth W and being propagated with velocity c, the beam being projected upon the area at an angle $\phi_B$, the beam having a width in both the track and cross-track platform direction, and further having the cross-track resolution dimension $p_Y$ being defined by the relationship:

$$p_Y = \frac{c}{2W \cos \phi_B}$$

means responsive to received reflected signals for measuring and recording the phase difference between each received reflected signal and a reference phase in order of time of arrival; and means for combining the phase difference signals from successive transmissions having a common time of arrival with reference to the time of transmission to yield a maximum at the track location and time of arrival corresponding to the location of a distinct acoustic reflector.

7. An apparatus according to claim 6, characterized in that the acoustic illuminating means comprises:

means for spacing the beam transmissions by a time interval equal to $1/\Delta f$, $\Delta f$ being the bandwidth of the modulation due to the platform motion past an acoustic reflector.

8. An apparatus for mapping an area from a platform moving relative to the area comprising:

means for acoustically illuminating the area with a modulated beam of bandwidth W and being propagated with velocity c, the beam having a width in both the track and cross-track platform directions and further being incident upon the area at an angle $\phi_B$, the cross-track resolution dimension $p_Y$ being thereby defined by the relationship:

$$p_Y = \frac{c}{2W \cos \phi_B}$$

the acoustic illuminating means further comprising:

a transmitting array whose track dimension defines the track resolution dimension independent of beam slant range; and means for spacing the beam transmissions by a time interval equal to $1/\Delta f$, $\Delta f$ being the bandwidth of the modulation;

means responsive to received reflected signals for measuring and recording the phase difference between each reflected signal and a reference phase in order of time of arrival; and means for combining the phase difference signals from successive transmissions having a common time of arrival with reference to the time of transmission to yield a maximum at the track location and time of arrival corresponding to the location of a distinct acoustic reflector.

9. An apparatus for mapping an area from a platform moving relative to the area comprising:

a source of distinct reference frequency signals;

means for acoustically illuminating the area with a plurality of substantially non-overlapping modulated coherent beams, each beam having a width in both the platform track and cross-track directions, the acoustic illuminating means includes:

means for projecting each beam downward and to the side away from the platform; and means for selecting a corresponding center frequency of each coherent beam responsive to each distinct reference frequency signal;

means responsive to received reflected signals for measuring and recording the phase difference between each received reflected signal and the corresponding distinct reference frequency signal in order of time of arrival; and means for combining the recorded phase difference signals from successive transmissions having a common time of arrival with reference to the time of transmission to yield a maximum at the track location and time of arrival corresponding to the location of a distinct acoustic reflector.

10. An apparatus for mapping an area from a platform moving relative to the area comprising:
- means for acoustically illuminating the area with a modulated coherent beam having a width in both the platform track and cross-track direction;
- means responsive to received reflected signals for measuring and recording the phase difference between each reflected signal and a reference phase in order of time of arrival;
- means for combining the recorded phase difference signals from successive transmissions having a common time of arrival with reference to the time of transmission to yield a maximum at the track location and time of arrival corresponding to the location of a distinct acoustic reflector;
- a source of geometric reference coordinates;
- means coupling the signal measuring means for sensing the present coordinates; and
- a correction unit responsive to the sensed coordinates and the reference coordinates for varying the transmit and receive beam directions as the difference between the sensed and referenced coordinates and further including means for compensating for the phase change resulting from the change in received and transmit beam directions.

11. An apparatus according to claim 10, characterized in that the means for measuring and recording received reflected signals comprise:
- a preamplifier responsive to received signals;
- a beam steering unit including:
    - a plurality of heterodynes for generating a beat frequency difference and its quadrature between the reference signal and a frequency signal from the correction unit; and
    - a plurality of matched filters coupling corresponding heterodynes.

12. An apparatus for mapping an area from a platform moving relative to the area comprising:
- a source of distinct reference signals;
- means for acoustically illuminating the area with a plurality of substantially non-overlapping modulated beams each having a modulation frequency bandwidth W and a distinctive center frequency, each beam further having a width in both the platform track and cross-track directions, the acoustic illuminating means further comprise:
    - means for selecting the corresponding center frequency of the coherent beam corresponding to each distinct reference frequency;
    - a transmitting array whose track dimension defines the track resolution dimension independent of slant range beam length, and whose cross-track resolution dimension being inversely proportional to the modulating frequency bandwidth W; and
    - means for spacing the beam transmissions by a time interval equal to $1/\Delta f$, $\Delta f$ being the bandwidth of the modulation due to platform motion past an acoustic reflector;
- means responsive to received reflected signals for measuring and recording the phase difference between each received reflected signal and the corresponding distinct reference frequency in order of time of arrival; and
- means for combining the recorded phase difference signals from successive transmissions having a common time of arrival with reference to the time of transmission to yield a maximum at the track location and time of arrival corresponding to the location of a distinct acoustic reflector.

References Cited

UNITED STATES PATENTS 3,296,579   1/1967   Farr et al. _____________ 340—3

RICHARD A. FARLEY, Primary Examiner

U.S. Cl. X.R.

343—5